Oct. 26, 1926.

L. S. HARBER

LOADER

Filed July 3, 1925

INVENTOR
LAURENCE S. HARBER
BY
Newell and Spencer
ATTORNEY

Oct. 26, 1926.

L. S. HARBER 1,604,348

LOADER

Filed July 3, 1925

INVENTOR
LAURENCE S. HARBER.
BY
Newell and Spencer.
ATTORNEY

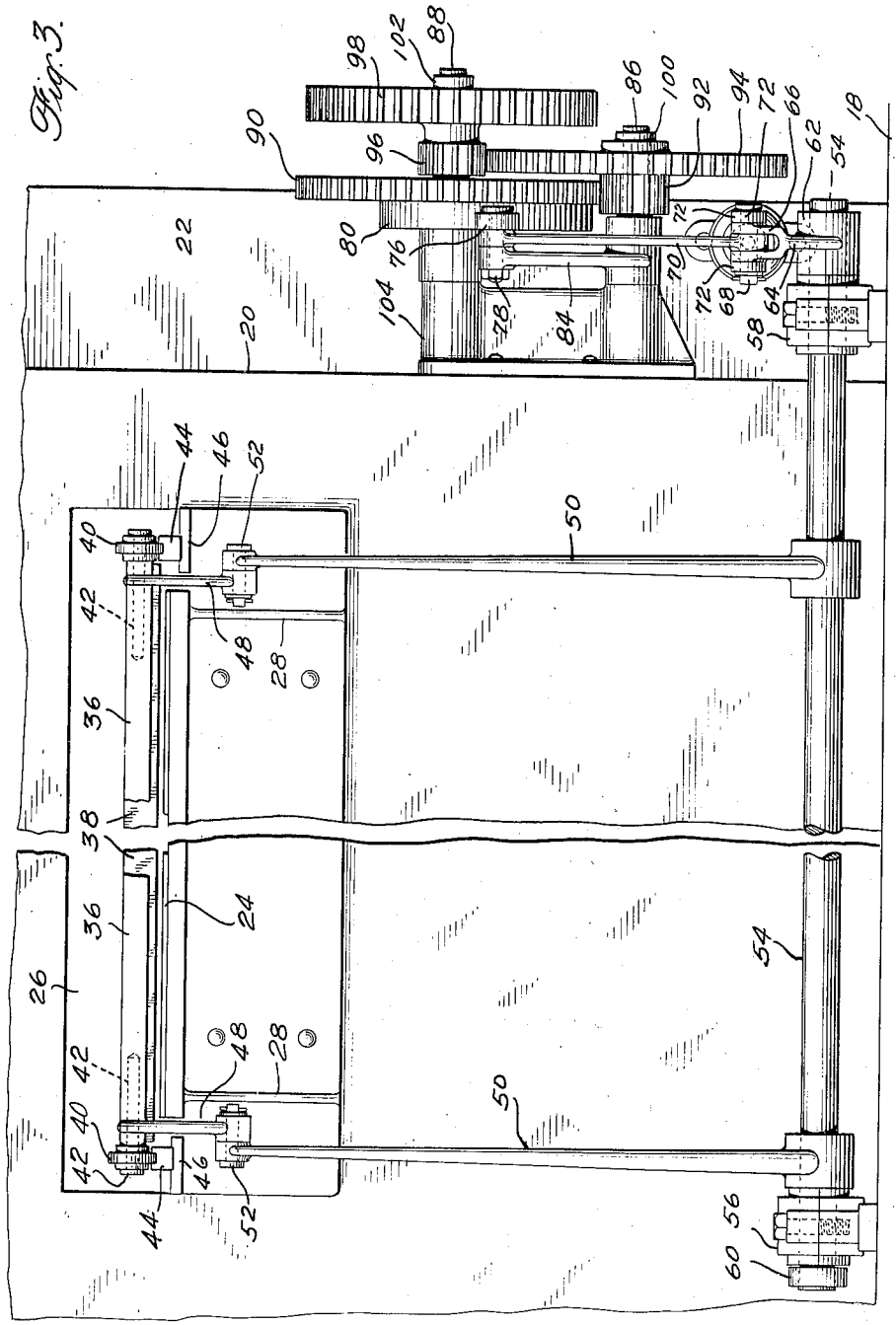

Patented Oct. 26, 1926.

1,604,348

UNITED STATES PATENT OFFICE.

LAURENCE S. HARBER, OF SAGINAW, MICHIGAN, ASSIGNOR TO BAKER-PERKINS COMPANY, INCORPORATED, OF WHITE PLAINS, NEW YORK.

LOADER.

Application filed July 3, 1925. Serial No. 41,268.

This invention relates to improvements in a form of apparatus generally termed "loaders" adapted for the automatic charging of ovens, leers, or the like, with articles to be treated therein. The invention comprises means for moving articles to be treated by means of a reciprocating device from a platform onto a moving conveyor or similar contrivance, by means of which the articles are carried into and through an oven.

The primary object of the invention is to provide an apparatus which is so constructed that all danger of damage to the articles being carried into the oven is avoided, and whereby the crushing or otherwise damaging the articles, as frequently takes place in other forms of loaders through encountering other obstacles during the forward passage, or through blocking during the passage, is wholly prevented.

With this and other objects in view, the invention comprises various features hereinafter more fully described and particularly defined in the claims.

My invention is particularly adapted to be applied to baking ovens in which articles to be baked are passed on an endless conveyor through the oven. In order to charge the article onto the conveyor to be passed through the oven, I provide a device for pushing or moving the articles from a stationary support, or charging plate, by means of which the articles may be suitably moved onto or positioned on, the moving platform or endless conveyor at predetermined or desired intervals. I preferably provide a device, termed a pusher bar, adapted to be reciprocated and which is mounted on suitable guides or guide members raising the same slightly above the charging plate. These guides consist preferably of wheels mounted at the ends of the pusher bar and running on stationary tracks supported at the sides of the charging plate or mounted in any other suitable manner. By this means the pusher bar during its movement is guided along and slightly above the charging plate, and the resistance of the pusher bar itself to its movement is minimized.

In order to reciprocate the pusher bar, I preferably employ suitable arms or link rods connected to the pusher bar in proximity to the wheels upon which the bar is mounted, the arms being in turn attached to levers, or other operating means, to which the arms are preferably pivotally connected. The levers for operating the arms are in turn connected to suitable operating means, being preferably keyed to a shaft which is rotatably mounted in stationary bearings, and operated or actuated in any suitable way to attain controlled movement of the levers.

The form of moving device or pusher bar which I preferably employ comprises a straight bar of a sufficient length to extend across substantially the whole width of the charging plate, although any suitable width may be employed, such as a width substantially that of the combined maximum width of the articles to be moved onto the conveyor belt, for example. The levers for operating the arms connected to the pusher bar are preferably of such a length that when the levers are reciprocated, the ends of the levers connected to the arms will describe or traverse an arc which is sufficiently flat so that the movement of the ends of the levers in a vertical plane is slight, and therefore will not interfere with the operation of the link rods and pusher bar. The link rods or arms connected to the levers and to the pusher bar are preferably of such a form, or are constructed of such a length that the front surface of the pusher bar, which is forced against the articles, retains, during its travel, substantially the same inclination with respect to the charging platform or surface on which the articles are supported.

In order to operate the shaft to which the levers connected to the link arms are attached, and thereby to operate the pusher rod connected to the arms, a separate short lever is preferably employed, which may be keyed or otherwise secured to the shaft. The movement of the separate lever is preferably controlled by an arm which is preferably pivotally connected to the short lever at one end and is operably connected to a cam at the other end which serves to transmit motion to the short lever. The movement of the arm is preferably attained by means of a roller carried by the arm and adapted to move over the periphery or outer surface of the cam, thereby transmitting motion to the lever corresponding to or depending on the shape or periphery of the cam. The roller is preferably held on the surface of the cam by resilient means, instead of being guided in a groove in the cam, whereby the movement of the lever corresponding to the withdrawal of the link arms out of the charging chamber is made positive in its action, whereas a yieldable movement in the reverse direction in which the articles to be treated are moved forward, is attained, the movement being subject to or dependent on the yieldable resilient or spring means. It is apparent therefore, that if any of the articles should become misplaced on the charging plate, causing a blocking of the feed mechanism, or if any foreign obstacle should come in the path of the pusher rod, the forward movement of the pusher rod would be arrested, whereby the possibility of breakage of the apparatus or damage to the articles is avoided.

The periphery or outer surface of the cam is of such a shape, and the cam is so arranged with respect to the other parts of the apparatus, that when the cam is rotated so as to move the levers and the pusher bar to their initial position or, in other words, to the position assumed before the articles are moved forward on the charging plate, the resilient or spring means is extended to its maximum, and the roller on the surface of the cam is at the greatest distance from the cam center, or axis of rotation. When the cam is turned from this initial position the resilient means is released to a greater or less extent depending upon the position of the wheel with respect to the axis or center of rotation of the cam, and in retracting, the resilient force of the spring means drives the pusher bar forward together with the articles on the charging plate which are moved forward into the charging chamber and onto the endless conveyor or conveyor platform.

It will be apparent from the above description that if, during the forward movement of the articles, an obstacle were encountered on the charging plate, or if a blocking of the articles should take place on the charging platform which the resilient force of the spring member could not overcome, the pusher bar would be arrested in its movement, and the wheel on the periphery of the cam would move away from the cam surface, until in the further movement of the cam, a part of the circumference of the cam would be reached where the wheel would again contact with the cam surface and the pusher rod would be moved back into its initial position. It will also be apparent that by employing a resilient means, or spring means, of suitable strength, depending upon the power necessary to overcome the normal resistance of the articles to be moved, the articles will be regularly fed onto the conveyor belt passing into the oven, without danger of accident or damage to the articles, or to the operating mechanism.

The various features of the invention are illustrated in the accompanying drawings, showing the preferred embodiment of my invention applied to the charging of continuous bake ovens or conveyor ovens for baking bread or the like, in which:

Fig. 3 is a view in front elevation of the loader in the position shown in Figure 1.

Figure 1:
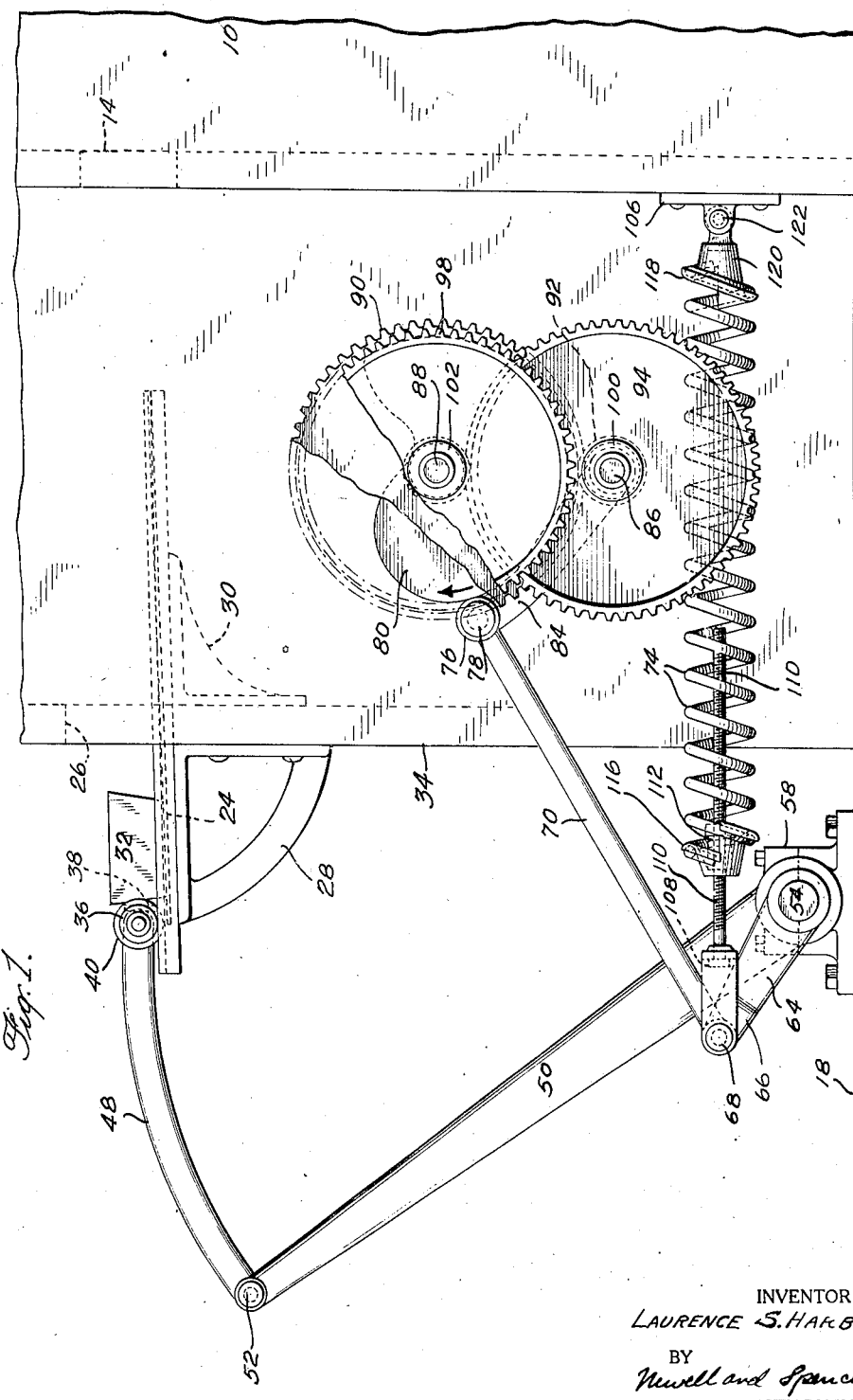
Fig. 1 is a side elevation of a loader, or charging means for an oven, embodying my invention and showing the pusher bar or actuating means in its initial position, or position in which articles to be fed to the endless conveyor are placed on the charging platform in front of the pusher bar or actuating means.

Referring more particularly to the drawings, the numeral 10 indicates an oven or furnace, a portion only of which is shown, and the numeral 12 indicates a charging chamber, which is shown in front of the oven. The charging chamber 12 is shown communicating with the oven 10 through an inlet or opening 14, through which a conveyor belt or endless conveyor 16 passes from the chamber to the oven.

The charging chamber is preferably of less width than the oven so as to leave room, at the side of the charging chamber and in front of the portion of the front wall of the oven which is not covered by the charging chamber, for a mechanism for operating the loader. The operating mechanism is preferably attached to the floor of the room in which the oven and charging chamber are located, and to the side wall 20 of the charging chamber and the exposed portion 22 of the front wall of the oven or furnace.

In order to feed or move articles at regular intervals or at predetermined periods onto the portion of the conveyor 16 passing into the oven 10, a platform or plate 24 is located in an opening 26 in the front wall of the charging chamber which is positioned therein at any suitable height. The platform 24 may be attached in place in any desired manner, preferably by means of a bracket 28 attached to the front wall of the charging chamber, and one or more brackets 30 at the inside of the charging chamber.

The articles to be fed onto the conveyor, such as bread pans 32, containing dough to be baked, are placed on the forward side of the platform 24, in front of the forward wall 34 of the charging chamber, and are forced by means of a pusher rod 36 or its equivalent along the charging plate into the desired position upon the endless conveyor. The endless conveyor 16 may be of any suitable form and may be operated in any desired manner. The specific form of the conveyor and the means by which the conveyor belt is actuated are not shown since they do not constitute a part of the present invention. The inlet 26 to the charging chamber 12, through which the pusher rod 36 passes in its movement from the external portion of the charging plate to within the charging chamber, is slightly wider than the pusher rod and may be made any desired height, depending upon the height of the articles to be charged into the oven, and the height of the arms or parts directly connected to the pusher rod.

The pusher rod 36 is preferably provided at its forward or charging side with a plate 38 against which the bread pans or other articles to be moved are adapted to rest. At the ends of the pusher bar are mounted wheels 40 which are preferably carried by means of pins 42 on which the wheels are adapted to rotate. The wheels 40 are shown as mounted on tracks 44 which are preferably supported at the sides of the charging plate 24 by means of brackets 46 or other suitable means connected to the framework of the charging chamber. Connected to the pusher rod preferably near its ends are two upwardly curved arms or link rods 48 which are preferably rigidly attached to the pusher rod. The outer ends of the arms or link rods 48 are connected to suitable operating means such as levers 50 to which they are preferably pivotally attached by means of suitable pins 52.

In order to operate the levers 50, thereby attaining operation of the pusher rod, the levers are preferably rigidly connected to a shaft 54, which is suitably supported in bearings in bearing blocks 56, 58, which may be supported on the floor 18 of a room. In order to prevent sidewise motion of the shaft 54 and the levers 50 connected thereto, a collar 60 is provided at the further end of the bearing 56 and a hub 62 carrying an operating lever 64 is attached to the shaft 54 at the further side of bearing 58, the hub 62 being keyed or otherwise suitably connected to the shaft 54. The lever 64, which serves through the shaft 54 and the parts connected thereto, to operate the pusher rod 36, is preferably provided with a forked end 66 in which are openings through which a hinge bolt 68 passes. Attached to the bolt 68, preferably between the branches of the fork 66 is a link rod 70 by means of which the lever 64 is actuated, and at the sides of the branches of the fork 66, supported on the bolt 68, are the arms of a swivel hook 72 to which a spring or other resilient means 74 is connected whereby the lever 64 is resiliently held in the position with a force determined by the relative position of the lever 70.

In order to operate the lever 64 through the link rod or arm 70, a wheel or roller 76 is mounted at one end of the arm 70, being mounted thereon by means of a hinge bolt 78 or other equivalent means. Connected also to the hinge bolt 78 is a stay rod 84, which is connected at its other end to a suitable support such as a shaft 86, to which it is pivotally connected, thereby serving to limit the movement of the roller 76 and the arm 70.

In order to produce the desired movement of the pusher rod at the required intervals a cam 80 is provided which is revolubly mounted on a shaft 88 in a plane with the roller 76, whereby the roller will be moved over the peripheral surface of the cam, thereby producing a movement of the rod 70 depending upon the configuration of the cam, the movement of the rod 70 being transmitted, as has heretofore been described, to the pusher rod.

The movement or rotation of the cam 80 may be attained in any suitable manner, preferably through a system of gears to attain the desired rate of rotation, the gear ratio employed depending upon the rate of rotation of the mechanism or part to which the gears are connected. The system of gears illustrated in the drawing comprises a gear wheel 90 which is rotatably mounted on the shaft 88 and is either rigidly affixed or made of one piece with the cam 80, also loosely mounted, as said before, on the same shaft. The gear 90 is driven by a small gear wheel 92 fixed on the shaft 86. The gear wheel 92 is preferably made integral with the gear 94 and meshes with a smaller gear wheel 96 fixed on the shaft 88, which is preferably made integral with the driving wheel or gear 98 connected to the source of power. In order to hold the gears in place on the shaft 86 a collar 100 is fixed thereon, and similarly to hold the driving wheel and gears in place on the shaft 88, a collar 102 is mounted at the end of the shaft. The shafts 82 and 86 are preferably mounted in bearings in a bracket member 104 which is preferably mounted on the side wall 20 of the charging chamber.

The resilient spring 74 is preferably mounted at one end on a bracket 106 suitably attached to a portion of the wall 22 of the oven 10, the other end of the spring being attached to the pin 68 by means of a swivel hook 108 having arms 72 as heretofore described. The swivel hook has connected thereto a screw rod 110 which is provided with a nut 112 adapted to turn thereon and to hold one end of the spring member 74 whereby the tension of the spring may be adjusted or regulated as desired. The spring member is held in position through nut 112 by means of a sleeve 114 which is slidably mounted on the rod 110 in front of the nut, the sleeve having arms or hooks 116 adapted to hold the end of the spring 74 so as to maintain the spring in tension during the operation of the apparatus. The other end of the spring may be attached in a similar manner to the bracket 106 by means of the arms or claws 118 of a holding member 120 which is preferably pivotally connected to the bracket 106 by means of a pin 122.

Figure 2:
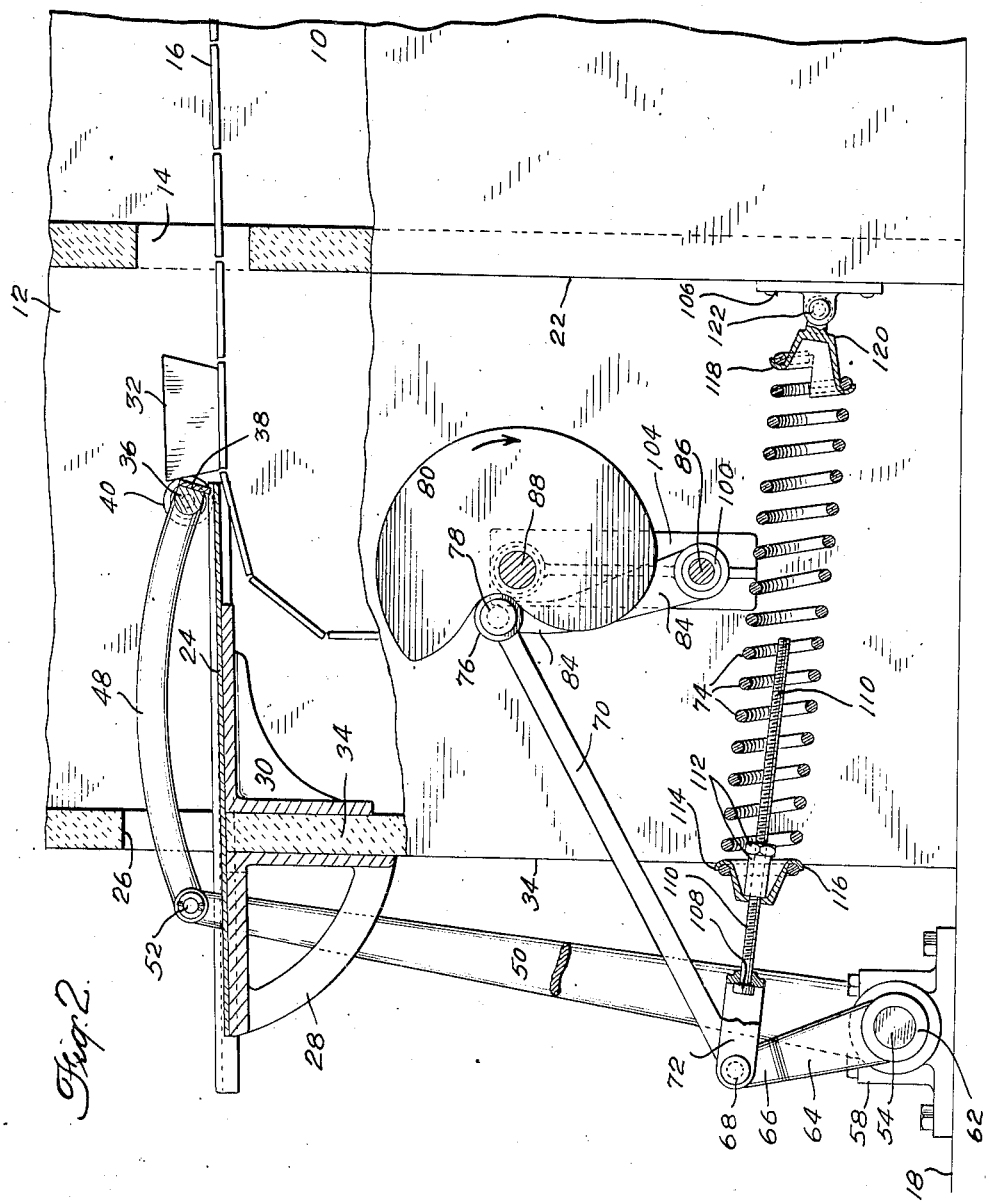
Fig. 2 is a side elevation of the loader partly in section, showing the pusher bar in the position in which articles are moved onto the conveyor plates or endless conveyor.

The operation of the charging mechanism or loader is as follows: The driving wheel 98 is driven from any suitable source of power, thus transmitting motion through the gears 96, 94, 92, 90 to the cam 80 which is thereby rotated at the desired rate. The rotation of the cam serves to transmit motion to the link or arm 70 through the roller 76 which is adapted to run on the peripheral surface of the cam and is held in contact with the surface by means of the resilient force of the spring 74 which is held in tension throughout the movement of the mechanism. The movement of the arm 70 transmits a corresponding motion to the lever 64 which in turn transmits a reciprocatory motion to the shaft 54 to which the levers 50 are connected, which are thereby moved forward and backward in accordance with the movement of the roller 76 away from and toward the center of rotation or axis 88 of the cam member 80. Through the movement of the levers or arms 50 the link arms 48 are reciprocated, whereby the pusher rod 36 is moved forward and back along the charging plate 24. During the movement of the cam 80 when the roller 76 is furthest away from the shaft 88 or center of rotation of the cam, the pusher rod 36 is in its retracted position shown in Figure 1 of the drawings, which is maintained through substantially half the revolution of the cam 80. While in this position the articles to be fed to the endless conveyor 16 are placed upon the charging plate 24, whereby when the cam 80, which rotates in a clockwise direction, reaches the point at which the peripheral surface approaches the shaft 88, the roller 76 moves along the surface and the arm 70 is thereby moved to the right in Figure 1 with a force depending on the tension of the spring member 74. The forward movement of the pusher bar corresponds to about a quarter of a revolution of the cam, in which portion of the revolution the roller 76 moves along the peripheral surface from the portion of maximum distance from the axis of rotation of the cam to the minimum distance from the said axis, and during this portion of the movement the roller is held on the peripheral surface of the cam with a force dependent on the strength and adjustment of the spring member 74. The articles which are moved along the charging plate 24 by means of the pusher bar are forced forward by means of a yielding force or, in other words, by means of a predetermined maximum force dependent upon the spring adjustment. It is apparent, therefore, that in case of blocking of the articles, or in the case of an obstacle being placed in the path of the articles to be moved onto the endless conveyor, the pushing force or force moving the articles along the charging plate would not exceed the force exerted by the spring in the corresponding position, whereby any danger of damage to the articles is prevented. After the articles have been moved onto the endless conveyor at which point the pusher rod 36 has attained the position shown in Figure 2, the roller 76 is at the point on the peripheral surface of the cam nearest to the axis of rotation and in the further rotation of the cam the roller 76 is forced outward by the peripheral surface of the cam which recedes from the center of rotation to the point of maximum distance therefrom, corresponding to approximately a quarter of a revolution of the cam, whereby the roller is again brought to the portion of maximum distance from the axis of rotation and the pusher bar 36 is correspondingly retracted or withdrawn to its initial position shown in Figure 1.

By controlling the speed of the driving means attached to the gear 98 or by suitably choosing the gear ratios employed in the connecting gears to drive the cam member 80 any desired period of operation of the pusher bar may be attained. Furthermore, by employing a suitable shape of cam the relative time of forward and return movement of the pusher bar during each single cycle of operation may be controlled. It is to be understood that various changes or modifications may be made in the apparatus as will be apparent to those skilled in the art without departing from the spirit or scope of the invention as defined in the claims.

Having thus described my invention what I claim as new is—

1. In a device of the class described, a baking oven, a charging chamber connected to said oven, an endless conveyor passing through said oven and extending into the said charging chamber, means for operating the said endless conveyor so as to cause movement thereof to carry articles from said charging chamber into said oven, a stationary support extending into said charging chamber upon which articles to be passed into said oven may be placed, and yieldable automatically operating means for moving articles on said support into said charging chamber and onto the said conveyor at predetermined intervals.

2. In a device of the class described, a baking oven, a charging chamber connected to said oven, an endless conveyor adapted to carry articles from said charging chamber into said oven, a charging plate positioned partly within and partly outside of said charging chamber, said plate being adapted to hold articles to be passed onto said conveyor, a pusher bar, supporting means for said bar adapted to guide the movements thereof along said charging plate, means for moving the said bar forward over the said plate to move said articles forward with a predetermined maximum force to prevent damage thereto, means for positively returning the said pusher bar to its initial position, means for regulating the period of operation of the said pusher bar, and means for controlling the relative time of forward and return movement of the said bar.

3. In a device of the class described, a baking oven, a charging chamber, an endless conveyor adapted to carry articles from said charging chamber into said oven, a charging plate located partly within the said charging chamber, said plate being adapted to hold articles to be passed to said endless conveyor, a pusher bar, means for mounting the said pusher bar over the said plate comprising wheels mounted on the said bar, and tracks for supporting the said wheels, whereby the said pusher bar is guided in its movement over the said plate, link rods connected to the said pusher bar, a lever connected to the said link rods to move the said bar over said plate, operating means connected to the said lever comprising a cam, a wheel adapted to move over the surface of said cam, connecting means between the said wheel and said lever to transmit forward and return movement to the said lever, resilient means for retaining the said wheel in contact with the peripheral surface of the said cam and to force the said pusher rod forwardly over the said plate with a predetermined maximum force whereby in case of blocking or other contingency the forward movement of the articles will be arrested and prevent damage to the articles.

Signed at Saginaw Michigan this 25th day of June 1925.

LAURENCE S. HARBER.